United States Patent
Bhushan et al.

(10) Patent No.: US 8,340,070 B2
(45) Date of Patent: Dec. 25, 2012

(54) RESOURCE PARTITIONING FOR WIRELESS COMMUNICATION SYSTEMS

(75) Inventors: Naga Bhushan, San Diego, CA (US); Alexei Gorokhov, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 811 days.

(21) Appl. No.: 11/864,792

(22) Filed: Sep. 28, 2007

(65) Prior Publication Data

US 2008/0101307 A1 May 1, 2008

Related U.S. Application Data

(60) Provisional application No. 60/828,027, filed on Oct. 3, 2006, provisional application No. 60/849,292, filed on Oct. 3, 2006, provisional application No. 60/828,265, filed on Oct. 5, 2006.

(51) Int. Cl.
*H04B 7/208* (2006.01)

(52) U.S. Cl. ......................................... 370/344

(58) Field of Classification Search ........................ None
See application file for complete search history.

(56) References Cited

U.S. PATENT DOCUMENTS

| | | | |
|---|---|---|---|
| 6,125,150 A | 9/2000 | Wesel et al. | |
| 6,985,498 B2 | 1/2006 | Laroia et al. | |
| 7,221,680 B2 * | 5/2007 | Vijayan et al. | 370/441 |
| 2003/0065697 A1 * | 4/2003 | Patel et al. | 708/491 |
| 2004/0142656 A1 * | 7/2004 | Bensimon et al. | 455/3.06 |
| 2005/0130665 A1 | 6/2005 | Laroia et al. | |
| 2005/0160347 A1 * | 7/2005 | Kim et al. | 714/776 |
| 2006/0121946 A1 | 6/2006 | Walton et al. | |
| 2006/0156199 A1 | 7/2006 | Palanki et al. | |
| 2006/0199596 A1 | 9/2006 | Teague et al. | |
| 2007/0097909 A1 * | 5/2007 | Khandekar et al. | 370/329 |
| 2008/0089281 A1 * | 4/2008 | Yoon et al. | 370/329 |

FOREIGN PATENT DOCUMENTS

| | | |
|---|---|---|
| EP | 1265411 | 12/2002 |
| RU | 2197779 C2 | 1/2003 |
| RU | 2264036 | 11/2005 |
| WO | WO0070791 A1 | 11/2000 |
| WO | WO0176098 A2 | 10/2001 |
| WO | WO2005043780 | 5/2005 |
| WO | WO2005125250 | 12/2005 |
| WO | WO2006019260 | 2/2006 |

OTHER PUBLICATIONS

China Unicom et al., "Joint Proposal for 3GPP2 Physical Layer for FDD Spectra; C30-20060731-040R4" [Online] Jul. 31, 2006, pp. 1-84, XP002468555. Retrieved from the Internet: URL:http://www.3gcn.org/3gpps/TSG-C-2006-07-31-Montreal/WG3/>[retrieved on Feb. 11, 2008].

(Continued)

*Primary Examiner* — Fan Ng
(74) *Attorney, Agent, or Firm* — Charles E. Eggers

(57) ABSTRACT

Partitioning resources so that they can be operated in different modes and synchronizing these partitioning among different sectors so that they can employ mutually cooperative power allocation settings are provided. The resources can be partitioned into one of two modes, namely, block mode or distributed mode. A user can be synchronized according to the mode and a zone, which can be based in part on the mode. The synchronization can be based on bit reversal order or quasi-uniform spacing of tones.

38 Claims, 10 Drawing Sheets

OTHER PUBLICATIONS

Tomcik, "MBFDD and MBTDD Wideband Mode: Technology Overview", Internet Citation, [Online] Oct. 28, 2005, XP002422172, Retrieved from the Internet: URL:http://www.ieee802.org/20/Contributions.html> [retrieved on Feb. 26, 2007].
International Search Report—PCT/US07/080065—International Search Authority—European Patent Office, Feb. 26, 2008.
Written Opinion—PCT/US2007/080066, International Search Authority—European Patent—Office Feb. 26, 2008.
Translation of Office Action in Russian application 2009116630 corresponding to U.S. Appl. No. 11/864,792, citing US20040095902, RU2197779, RU2264036, US20060199596, US20060156199, US6125150 and EP1265411 dated Apr. 18, 2011.
Taiwan Search Report—TW096137183—TIPO—Jun. 11, 2011.

* cited by examiner

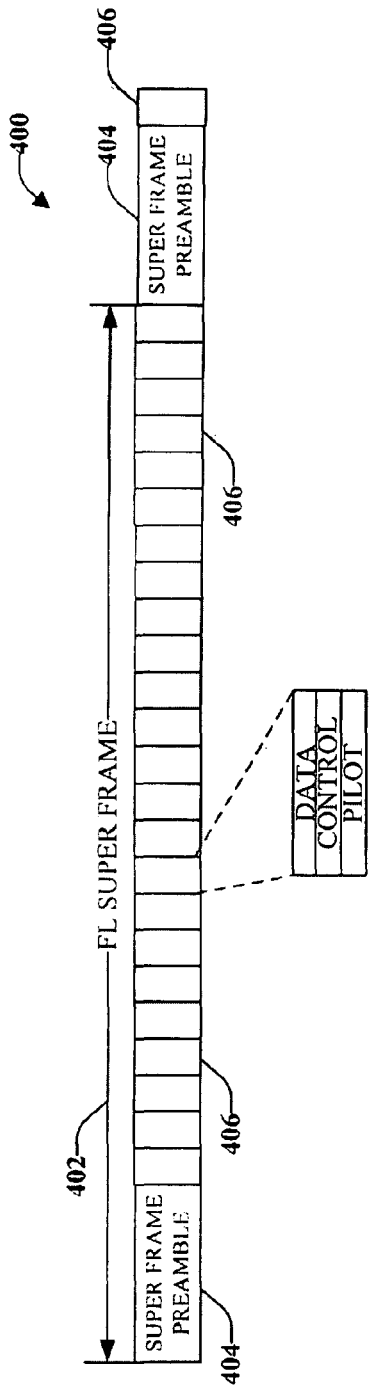
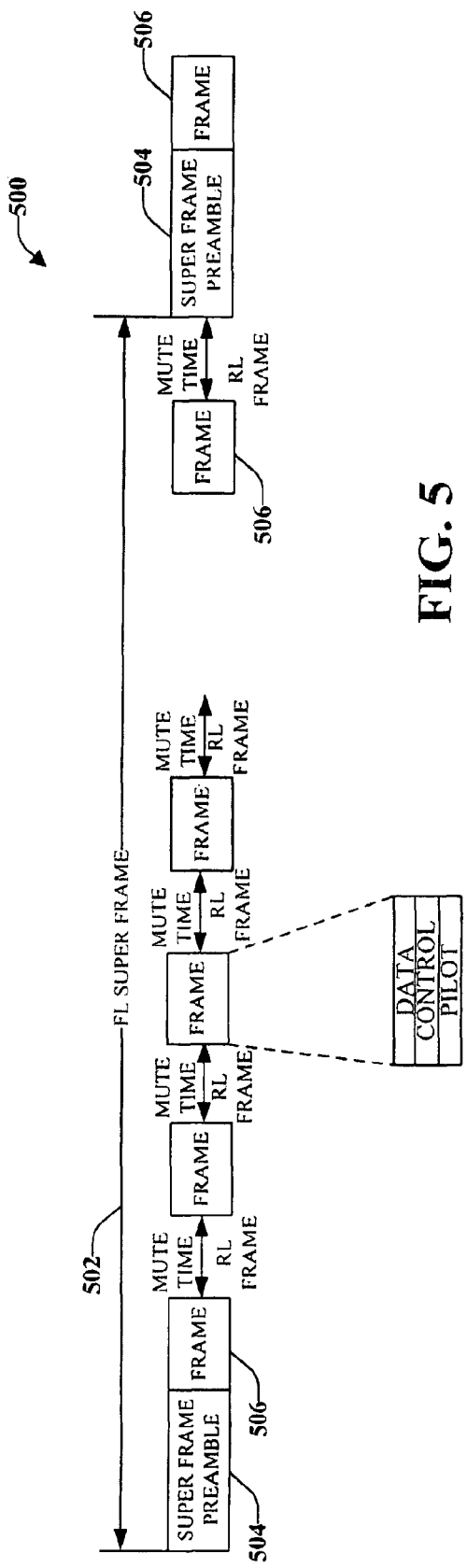
FIG. 4
FIG. 5

RESOURCE PARTITIONING FOR WIRELESS COMMUNICATION SYSTEMS

CROSS-REFERENCE

This application claims the benefit of U.S. Provisional Application Ser. No. 60/828,027, filed Oct. 3, 2006, entitled "SYSTEM AND METHOD FOR RESOURCE PARTITIONING FOR WIRELESS COMMUNICATION SYSTEMS", and U.S. Provisional Application Ser. No. 60/849,292, filed Oct. 3, 2006, entitled "DRCH/BRCH Multiplexing", and U.S. Provisional Application Ser. No. 60/828,265, filed Oct. 5, 2006, entitled "SYSTEM AND METHOD FOR RESOURCE PARTITIONING FOR WIRELESS COMMUNICATION SYSTEMS". The entireties of these applications are incorporated herein by reference.

BACKGROUND

I. Field

The following description relates generally to wireless communication systems, and amongst other things to resource partitioning for wireless communication systems.

II. Background

Wireless communication systems have become a prevalent means by which a majority of people worldwide have come to communicate. Wireless communication devices have become smaller and more powerful in order to meet consumer needs and to improve portability and convenience. The increase in processing power in mobile devices, such as cellular telephones, has lead to an increase in demands on wireless network transmission systems. Such systems typically are not as easily updated as the cellular devices that communicate there over. As mobile device capabilities expand, it can be difficult to maintain an older wireless network system in a manner that facilitates fully exploiting new and improved wireless device capabilities.

Wireless communication systems generally utilize different approaches to generate transmission resources in the form of channels. These systems may be code division multiplexing (CDM) systems, frequency division multiplexing (FDM) systems, and time division multiplexing (TDM) systems. One commonly utilized variant of FDM is orthogonal frequency division multiplexing (OFDM) that effectively partitions the overall system bandwidth into multiple orthogonal subcarriers. These subcarriers may also be referred to as tones, bins, and frequency channels. Each subcarrier can be modulated with data. With time division based techniques, each subcarrier can comprise a portion of sequential time slices or time slots. Each user may be provided with one or more time slot and subcarrier combinations for transmitting and receiving information in a defined burst period or frame. The hopping schemes may generally be a symbol rate hopping scheme or a block hopping scheme.

Code division based techniques typically transmit data over a number of frequencies available at any time in a range. In general, data is digitized and spread over available bandwidth, wherein multiple users can be overlaid on the channel and respective users can be assigned a unique sequence code. Users can transmit in the same wide-band chunk of spectrum, wherein each user's signal is spread over the entire bandwidth by its respective unique spreading code. This technique can provide for sharing, wherein one or more users can concurrently transmit and receive. Such sharing can be achieved through spread spectrum digital modulation, wherein a user's stream of bits is encoded and spread across a very wide channel in a pseudo-random fashion. The receiver is designed to recognize the associated unique sequence code and undo the randomization in order to collect the bits for a particular user in a coherent manner.

A typical wireless communication network (e.g., employing frequency, time, and/or code division techniques) includes one or more base stations that provide a coverage area and one or more mobile (e.g., wireless) terminals that can transmit and receive data within the coverage area. A typical base station can simultaneously transmit multiple data streams for broadcast, multicast, and/or unicast services, wherein a data stream is a stream of data that can be of independent reception interest to a mobile terminal. A mobile terminal within the coverage area of that base station can be interested in receiving one, more than one, or all the data streams transmitted from the base station. Likewise, a mobile terminal can transmit data to the base station or another mobile terminal.

SUMMARY

The following presents a simplified summary in order to provide a basic understanding of some aspects of the disclosed embodiments. This summary is not an extensive overview and is intended to neither identify key or critical elements nor delineate the scope of such embodiments. Its purpose is to present some concepts of the described embodiments in a simplified form as a prelude to the more detailed description that is presented later.

In accordance with one or more embodiments and corresponding disclosure thereof, various aspects are described in connection with partitioning resources so that they can be operated in different modes and synchronizing these partitioning among different sectors so that they can employ mutually cooperative power allocation settings.

An aspect is related to a method for partitioning resources. The method includes partitioning resources into modes and synchronizing the partitioned resources among multiple sectors. Method further includes communicating with a user according to the modes and the synchronization. The modes include a block mode or a distributed mode.

In accordance with another aspect is a wireless communications apparatus that includes a processor and memory. The processor executes instructions for partitioning resources into one of two modes, synchronizing the partitioned resources among multiple sectors, and communicating with a user according to the modes and the synchronization. The memory stores information related to the instructions generated by the processor.

Another aspect relates to a wireless communications apparatus that provides resource partitioning. The apparatus includes a means for partitioning resources into one of two modes and a means for synchronizing the partitioned resources among multiple sectors. Also includes in apparatus is a means for communicating with a user according to the modes and the synchronization.

Yet another aspect relates to a machine-readable medium having stored thereon machine-executable instructions for partitioning resources into block mode or a distributed mode. The instructions also include synchronizing the partitioned resources among multiple sectors and communicating with a user according to the modes and the synchronization.

An apparatus operable in a wireless communication system is another related aspect. The apparatus includes a processor configured to allocate a first group of subcarriers for symbol rate operation and designate a second group of subcarriers to block mode operation. A zone can be determined according to the operation. The processor can also be configured to divide the zone into a plurality of subzones and distribute the subzones utilizing a bit reversal order or a quasi-uniform spacing of tones.

To the accomplishment of the foregoing and related ends, one or more embodiments comprise the features hereinafter fully described and particularly pointed out in the claims. The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

BRIEF DESCRIPTION OF THE DRAWINGS

FIG. 4 illustrates aspects of superframe structures for a frequency division duplexed (FDD) multiple access wireless communication system.

FIG. 5 illustrates aspects of superframe structures for a time division duplexed (TDD) multiple access wireless communication system.

DETAILED DESCRIPTION

Figure 1:
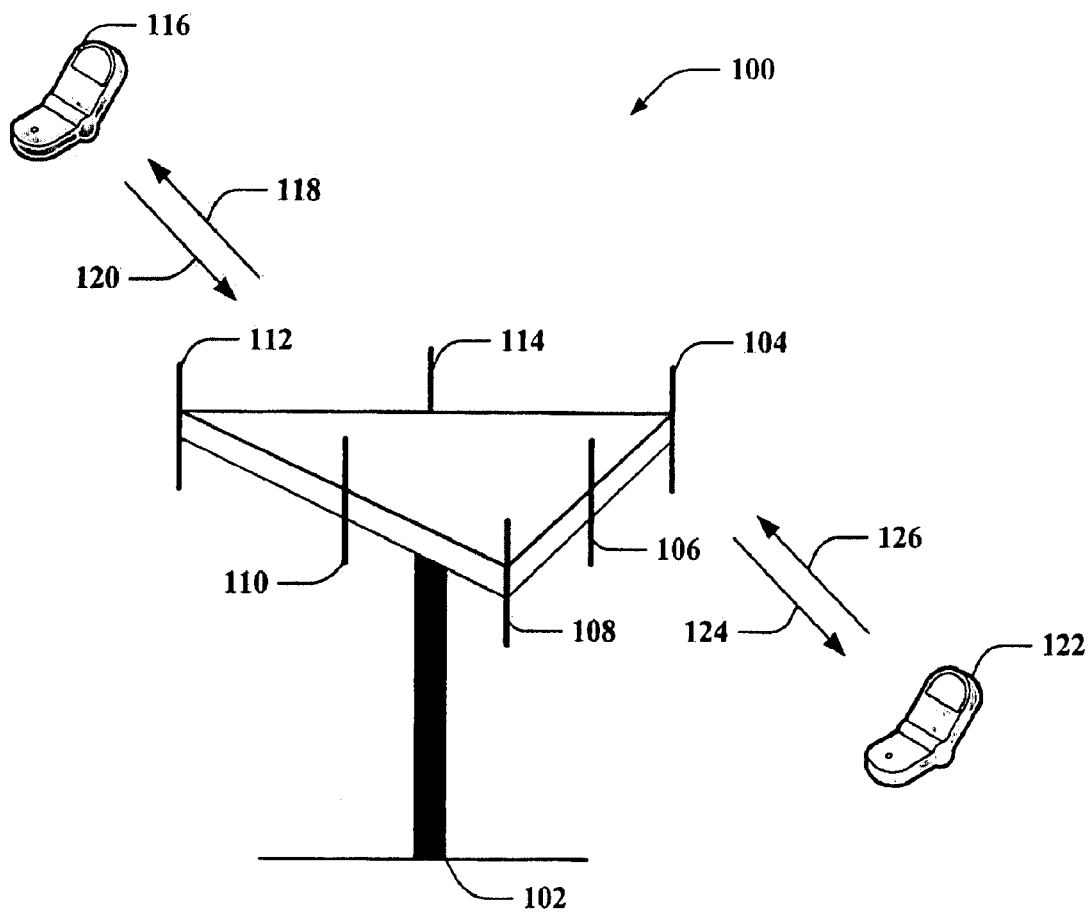
FIG. 1 illustrates a multiple access wireless communication system that can be utilized for resource partitioning.

Various embodiments are now described with reference to the drawings. In the following description, for purposes of explanation, numerous specific details are set forth in order to provide a thorough understanding of one or more aspects. It may be evident, however, that such embodiment(s) may be practiced without these specific details. In other instances, well-known structures and devices are shown in block diagram form in order to facilitate describing these embodiments.

As used in this application, the terms "component", "module", "system", and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a wireless terminal. A wireless terminal can also be called a system, subscriber unit, subscriber station, mobile station, mobile, mobile device, remote station, remote terminal, access terminal, user terminal, terminal, wireless communication device, user agent, user device, or user equipment (UE). A wireless terminal may be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station may be utilized for communicating with wireless terminal(s) and may also be referred to as an access point, Node B, or some other terminology.

Various aspects or features will be presented in terms of systems that may include a number of devices, components, modules, and the like. It is to be understood and appreciated that the various systems may include additional devices, components, modules and/or may not include all of the devices, components, modules discussed in connection with the figures. A combination of these approaches may also be used.

With reference now to the drawings, FIG. 1 illustrates a multiple access wireless communication system 100 that can be utilized for resource partitioning. Resources can be partitioned into a distributed zones and localized zones. The purpose of distributed zones is to provide a lot of diversity, which is applicable in situation where channel conditions cannot be predicted. Diversity is desired because an assignment lacking in diversity and might be located in portions of the channels or portions of the band that might not provide adequate signal quality (e.g., the channel fades out). On the other hand, if there is a user that has a slowly changing channel changing quality (e.g., nearly static user), which is predictable by the scheduler, then the system can take advantage of localized assignments by scheduling the user on that portion of the localized zone where the user's channel provides good signal quality.

System 100 includes an access point 102 (AP) that can include multiple antenna groups, one including 104 and 106, another including 108 and 110, and an additional group including 112 and 114. In FIG. 1, only two antennas are illustrated for each antenna group, however, more or fewer antennas may be utilized for each antenna group. Access terminal 116 (AT) is in communication with antennas 112 and 114, where antennas 112 and 114 transmit information to access terminal 116 over forward link 118 and receive information from access terminal 116 over reverse link 120. Access terminal 122 is in communication with antennas 106 and 108, where antennas 106 and 108 transmit information to access terminal 122 over forward link 124 and receive information from access terminal 122 over reverse link 126. In a Frequency Division Duplex (FDD) system, communication links 118, 120, 124 and 126 may use different frequencies for communication. For example, forward link 118 may use a different frequency then that used by reverse link 120. In accordance with some aspects, a single frequency network (SFN) can be utilized.

Each group of antennas and/or the area in which they are designed to communicate is often referred to as a sector of the access point. As illustrated, antenna groups can be designed to communicate to access terminals in a sector of the areas covered by access point 102.

In communication over forward links 118 and 124, the transmitting antennas of access point 102 utilize beamforming in order to improve the signal-to-noise ratio of forward links for the different access terminals 116 and 122. Also, an access point using beamforming to transmit to access terminals scattered randomly through its coverage causes less interference to access terminals in neighboring cells than an access point transmitting through a single antenna to all its access terminals.

As used herein, an access point may be a fixed station used for communicating with the terminals and may also be referred to as, and include some or all the functionality of, a base station, a Node B, or some other terminology. An access terminal may also be referred to as, and include some or all the functionality of, a user equipment (UE), a wireless communication device, a terminal, wireless terminal, a mobile station or some other terminology.

Figure 2:
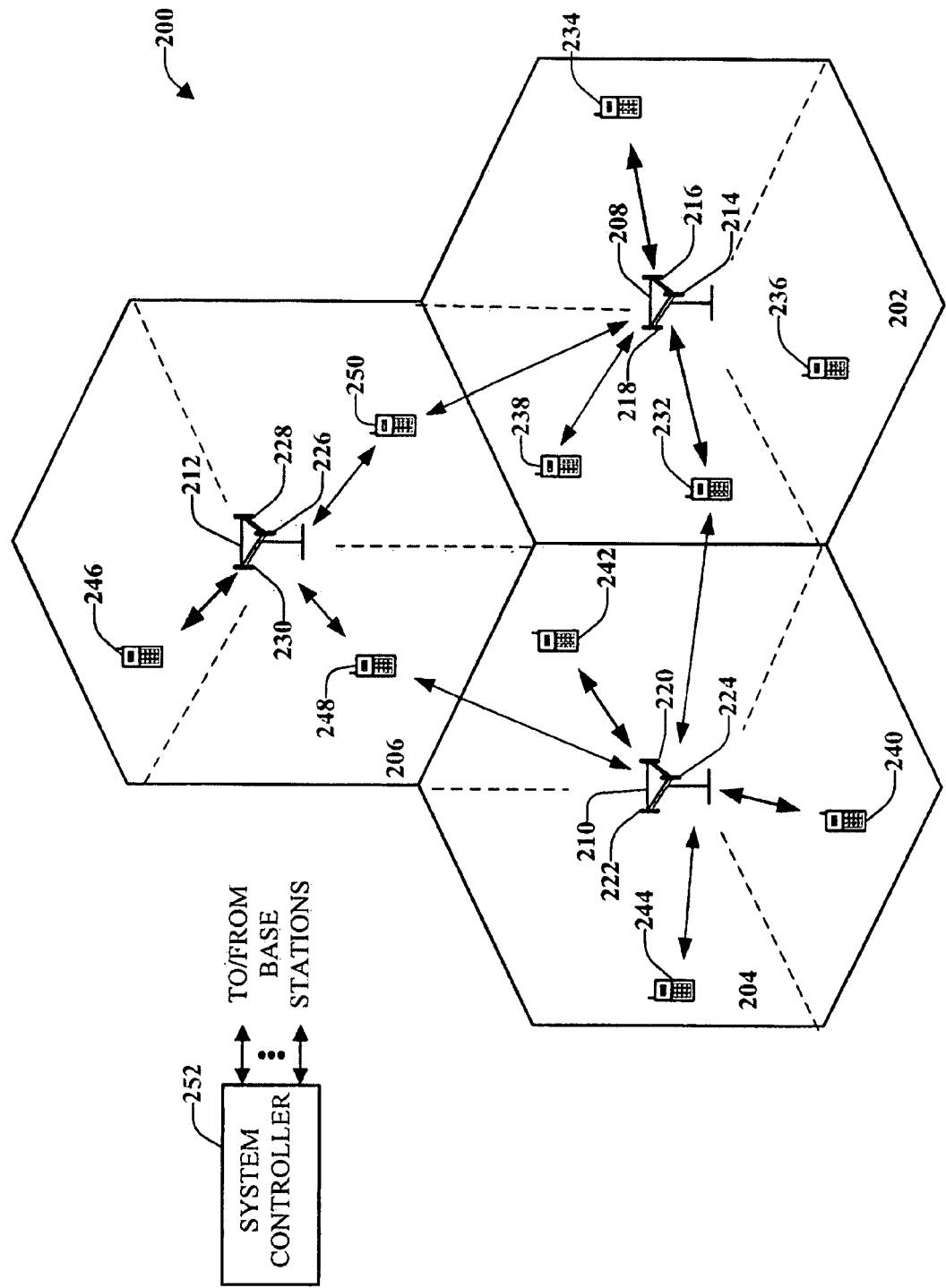
FIG. 2 illustrates a multiple access wireless communication system according to various embodiments for portioning resources.

FIG. 2 illustrates a multiple access wireless communication system 200 according to various embodiments for portioning resources. System 200 can facilitate partitioning resources so that they can be operated in different modes and synchronizing these partitioning among different sectors so that they can employ mutually cooperative power allocation settings.

In further detail, a multiple access wireless communication system 200 includes multiple cells, e.g. cells 202, 204, and 206. In the embodiment of FIG. 2, each cell 202, 204, and 206 may include an access point 208, 210, 212 that includes multiple sectors. The multiple sectors are formed by groups of antennas each responsible for communication with access terminals in a portion of the cell. In cell 202, antenna groups 214, 216, and 218 each correspond to a different sector. In cell 204, antenna groups 220, 222, and 224 each correspond to a different sector. In cell 206, antenna groups 226, 228 and 230 each correspond to a different sector.

Each cell includes several access terminals, which are in communication with one or more sectors of each access point. For example, access terminals 232, 234, 236, and 238 are in communication with base station 208, access terminals 240, 242, and 244 are in communication with access point 210, and access terminals 246, 248, and 250 are in communication with access point 212.

As illustrated in cell 204, for example, each access terminal 240, 242, and 244 is located in a different portion of it respective cell than each other access terminal in the same cell. Further, each access terminal 240, 242, and 244 may be a different distance from the corresponding antenna groups with which it is communicating. Both of these factors provide situations, also due to environmental and other conditions in the cell, to cause different channel conditions to be present between each access terminal and its corresponding antenna group with which it is communicating.

In accordance with some aspects, access terminals in a particular cell may be in communication with the access point associated with that cell and at substantially the same time be in communication with an access point associated with a different cell. For example, access terminal 232 may be in communication with access point 208 and 210; access terminal 248 may be in communication with access points 210 and 212; and access terminal 250 may be in communication with access points 208 and 212.

An access terminal in communication with two or more access points might receive a signal on the forward link from each access point, which is substantially the same signal (e.g., an access point impersonates another access point transparently to a terminal). However, access terminal might not know, or care, which access point it is in communication with because access terminal receives a signal that appears to be from a master sector. Thus, a different sector impersonates the master sector. On the reverse link, the access terminal can transmit and both sectors (e.g., access points) can listen and whichever access point has the better channel can serve the access terminal. Further information relating to this will be provided below in the following figures.

A controller 252 is coupled to each of the cells 202, 204, and 206. Controller 252 may contain one or more connections to multiple networks, such as the Internet, other packet based networks, or circuit switched voice networks that provide information to, and from, the access terminals in communication with the cells of the multiple access wireless communication system 200. Controller 252 includes, or is coupled with a scheduler that schedules transmission from and to access terminals. In some embodiments, scheduler may reside in each individual cell, each sector of a cell, or a combination thereof.

Each of the sectors can operate utilizing one or more of a plurality of carriers. Each carrier is a portion of a larger bandwidth in which the system can operate, or is available for communication. A single sector utilizing one or more carriers may have multiple access terminals scheduled on each of the different carriers during any given time interval (e.g., frame or superframe). Further, one or more access terminals may be scheduled on multiple carriers at substantially the same time.

An access terminal may be scheduled in one carrier or more than one carrier according to capabilities. These capabilities may be part of the session information that is generated when the access terminal attempts to acquire communication or that has been negotiated previously, may be part of the identification information that is transmitted by access terminal, or may be established according to another approach. In certain aspects, the session information may comprise a session identification token that is generated by querying the access terminal or determining its capabilities through its transmissions.

It should be noted that while FIG. 2, depicts physical sectors (e.g., having different antenna groups for different sectors), other approaches may be utilized. For example, utilizing multiple fixed "beams" that each cover different areas of the cell in frequency space may be utilized in place of, or in combination with, physical sectors.

Figure 3:
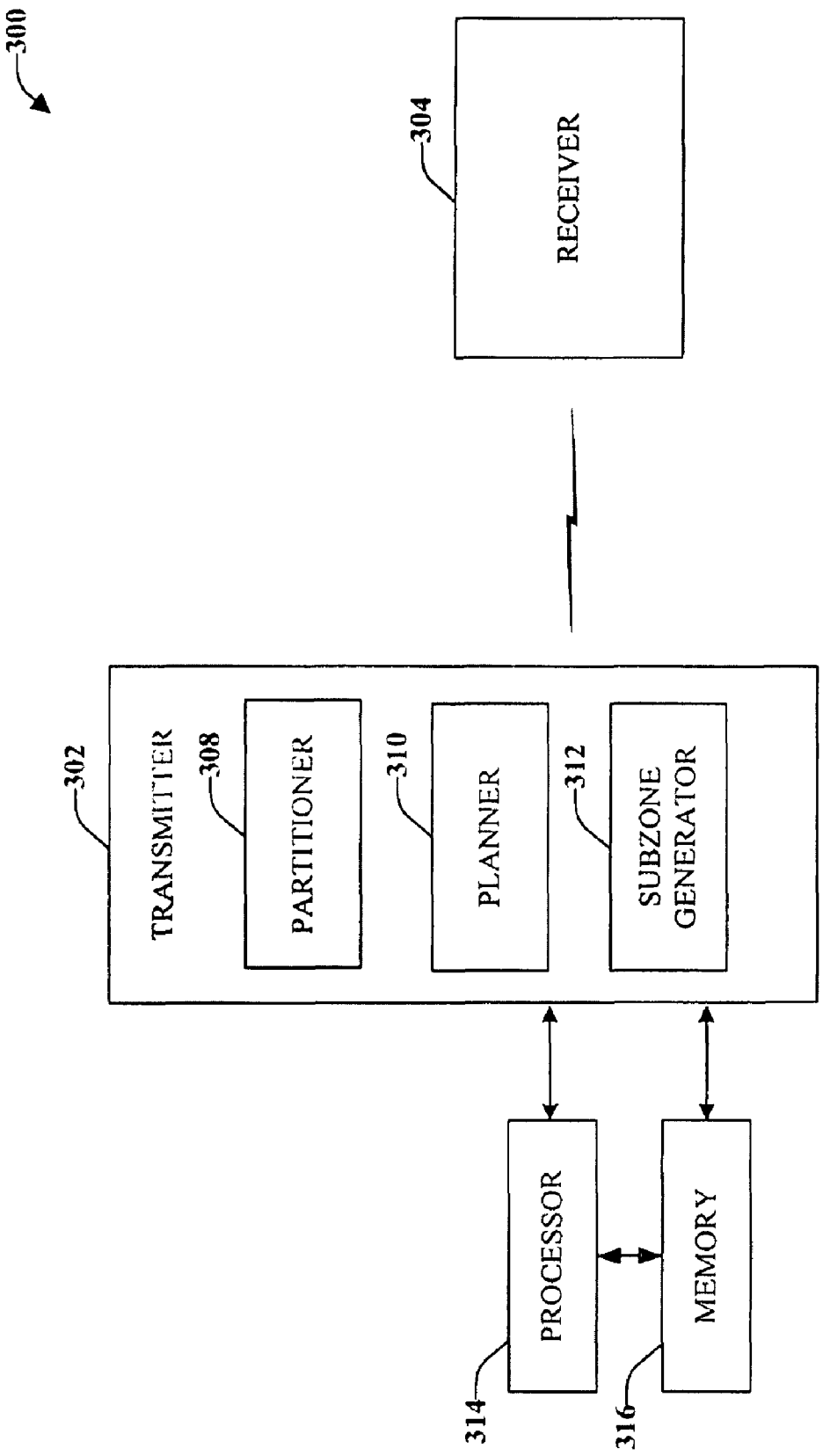
FIG. 3 illustrates an example system that facilitates resource partitioning.

FIG. 3 illustrates an example system 300 that facilitates resource partitioning. System 300 can be configured to partition resources so that the resources can be operated in different modes. There are at least two modes of operation, namely, symbol rate hopping and block rate hopping. Additionally, system 300 can be configured to synchronize the partitioning among different sectors so that the different sectors can employ mutually cooperative power allocation settings.

In further detail, system 300 includes a transmitter 302 that is in wireless communication with a receiver 304. Transmitter 302 can be a base station and receiver 304 can be a communication device. It should be understood that system 300 can include one or more transmitters 302 and one or more receivers 304. However, only one receiver and only one transmitter are shown for purposes of simplicity.

Transmitter 302 includes a partitioner 306 that can be configured to assign a mode. A fraction or subset of resources can be assigned to a symbol rate hopping mode (or distributed resource channels) and another fraction or subset of resources can be assigned to a block rate hopping mode (or block resource channels). The mode (distributed or block) can be determined utilizing various means including analysis of channel conditions, which might be previously reported channel conditions (e.g., channel quality indicators from the users) or based on other criteria including quality of service, and other factors that can be taken into account for mode assignment. Further, the mode assignment could have been previously determined and can persist depending on the user and system parameters.

Transmitter 302 includes a planner 306 that can be configured to determine a zone, which is a collection of resources, of a receiver 304 based upon the assigned mode. To create a zone, a subset of carriers can be chosen in a random order or permuted order. A first subset of zones can be assigned to symbol rate hopping zones (DRCH zones) and the remaining subcarriers can be assigned to block rate hopping zones (BRCH zones).

For example, in OFDM a zone is a tone-symbol combination and a set of tone-symbols can be fixed. Two types of zones can be created, namely, a symbol rate hopping zone and a block rate hopping zone. The symbol rate hopping zone is also referred to as a distributed rate resource channel zone (DRCH zone). The block rate hopping zone is also referred to as a block resource channel zone (BRCH zone). Symbol rate hopping indicates that a particular channel (DRCH) includes tones and symbols that are scattered over the entire available bandwidth and time. For symbol rate hopping, the group of subcarriers or tones in a channel changes every symbol, thus, for each OFDM symbol, a particular channel can occupy a different set of subcarriers. Symbol rate hopping uses a distributed channel where each channel includes tones or subcarriers that are spread out.

In a block rate hopping zone, an individual channel (BRCH) includes contiguous groups of subcarriers and symbols. In block rate hopping, a set of subcarriers in a channel is fixed over a frame that includes a number of symbols. Once a frame boundary is crossed, where the boundary comprises a number of symbols, there is hopping to a different set of subcarriers. Thus, the tone the channel occupies remains the same for the number of symbols and then it changes. It should be noted that as used herein, the terms "subcarriers" and "tones" are used interchangeably. Further a number of symbols (e.g., 8 symbols) can be partitioned into a number of subcarrier tones. Thus, for an entire resource block (e.g., superframe), a first subset utilizes a symbol rate hopping zone and a second subset utilizes a block rate hopping zone.

Also included in transmitter 302 is a subzone generator 312 that can be configured to divide one or more zones into multiple subzones. Within each subzone, channels can be created and each channel hops within its respective subzone. For example, the channels in two DRCH subzones behave similarly but they do not cross over into other subzones. Thus, two subzones of the same zone carry similar channels but they do not hop into each other. Fractional Frequency Reuse (FFR) whereby different subzones can be allocated different amounts of power by neighboring sectors can be utilized when the subzones do not cross over. FFR can be performed in a manner that is consistent with what neighboring sectors are doing. Thus, resources can be partitioned so that on some resources, a particular sector transmits at high power but neighboring sectors do not transmit at a high power in those subzones. In other subzones, neighboring sectors transmit at high power and the other sectors (e.g., the particular sector referred to in the preceding sentence) do not transmit at high power.

To enable the above behavior, the subzone is synchronized but the hopping is not synchronized. Within each subzone different channels hop in a random fashion in multiple sectors so that the same channel does not always collide with the same channel in other sectors. The hopping is desynchronized but the subzones are synchronized.

System 300 can include a processor 314 operatively connected to transmitter 302 (and/or a memory 316) to execute instructions relating to assigning modes, assigning zones based in part on the assigned modes, and dividing zones into multiple subzones. Memory 316 can store information related to the instructions executed by processor 314 and other suitable information related to partitioning resources in a communication network.

Processor 314 can be a processor dedicated to analyzing and/or generating information received by transmitter 302. Processor 314 can also be a processor that controls one or more components of system 300, and/or a processor that both analyzes and generates information received by transmitter 302 and controls one or more components of system 300.

Memory 316 can store protocols associated with partitioning resources, assigning zones, partitioning zones into subzones, taking action to control communication between transmitter 302 and receiver 304, etc., such that system 300 can employ stored protocols and/or algorithms to achieve resource partitioning and synchronization in a wireless network as described herein.

It should be appreciated that the data store (e.g., memories) components described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (DRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory 316 of the disclosed embodiments are intended to comprise, without being limited to, these and other suitable types of memory.

Distributed zones provide the maximum amount of diversity. In the situation where diversity is desired because the channel conditions cannot be predicted (e.g., fast moving channel or fast moving user), then DRCH can be utilized. On the other hand, if other users are to be handled, system can benefit from multi-user diversity (e.g., review conditions and choose a user whose particular condition in a particular part of the band is good), then BRCH can be utilized.

Thus, in any particular system, both DRCH and BRCH can be utilized. This is because in any system there can be some users moving fast and some users moving slow. In addition, there are data channels and control channels. For control channels, the system might not be able to apply multi-user diversity, thus users moving fast can be scheduled on distributed zones and users moving slowly can be scheduled on block zones and schedule control channel, for example, on block zone.

To fully appreciate the disclosed features, FIGS. 4 and 5 illustrate aspects of superframe structures for a multiple access wireless communication system. FIG. 4 illustrates aspects of superframe structures 400 for a frequency division duplexed (FDD) multiple access wireless communication system, while FIG. 5 illustrates aspects of superframe structures 500 for a time division duplexed (TDD) multiple access wireless communication system In both FIGS. 4 and 5, the forward link transmission is divided into units of superframes 402 and 502. A superframe may include a superframe preamble 404 and 504 followed by a series of frames, of which a few are illustrated at 406 and 506. In an FDD system, the reverse link and the forward link transmission may occupy different frequency bandwidths so that transmissions on the links do not, or for the most part do not, overlap on any frequency subcarriers. In a TDD system, N forward link frames and M reverse link frames define the number of sequential forward link and reverse link frames that can be continuously transmitted prior to allowing transmission of the opposite type of frame. It should be noted that the number of N and M can vary within a given superframe or between superframes.

In both FDD and TDD systems each superframe may comprise a superframe preamble 404 and 504. In certain embodiments, the superframe preamble includes a pilot channel that includes pilots that can be used for channel estimation by access terminals and acquisition information such as timing and other information sufficient for an access terminal to communicate (e.g., receive and transmit). The superframe preamble may further include a broadcast channel that includes configuration information that the access terminal can utilize to demodulate the information contained in the forward link frame on one of the carriers and basic power control or offset information. In other cases, only some of the above and/or other information may be included in this superframe preamble.

As shown in FIGS. 4 and 5, the superframe preamble 404 and 504 is followed by a sequence of frames, a few of which are illustrated at 406 and 506. Each frame may include a same or a different number of OFDM symbols, which can constitute a number of subcarriers that may be simultaneously utilized for transmission over some defined period.

Further, each frame may be partitioned to have one or more subzones operating according to a symbol rate mode, where one or more non-contiguous OFDM symbols, subcarriers, or combinations thereof, are assigned to a user device on a forward link or reverse link, and one or more subzones operating according to a block mode, where user devices are assigned contiguous OFDM symbols, subcarriers, or combinations thereof. The subcarriers assigned to symbol rate user devices need not be contiguous throughout the frame and can be interspersed between block users.

In accordance with some aspects, a total bandwidth may be divided into a number carriers that are subsets of the total bandwidth. The carriers may comprise 5 MHz of a 20 MHz bandwidth, with carrier comprising 512 subcarriers. However, other sizes of bandwidth, subcarriers, and carriers can be utilized. Further, the number of subcarriers allocated to each carrier may vary, so that the number of subcarriers in each carrier may be different from each other carrier or one carrier can have more subcarriers than the other carriers. In addition, it should be noted that one or more carriers may be asynchronous with respect to each other (e.g., having different start and end times for their forward link frame and/or reverse link frame). Signaling or assignment messages, in the control channel or superframe preamble can communicate the timing information in such cases for a particular carrier.

In other aspects, a carrier may comprise a bandwidth of 1.25 MHz, (e.g., having 128 subcarriers) or 2.5 MHz (e.g., having 256 subcarriers). It should be noted that the number of subcarriers can vary by carrier. Further, the size of bandwidth is subject to the applicable bandwidth allotments, and divisions thereof, of the applicable regulatory agency.

The actual size of the superframe preamble in OFDM symbols versus the number of frames, and OFDM symbols per frame, can vary by deployment in order to provide sufficient ability to demodulate the information maintained in the superframe preamble while maintaining sufficiently low overhead.

Figure 6:
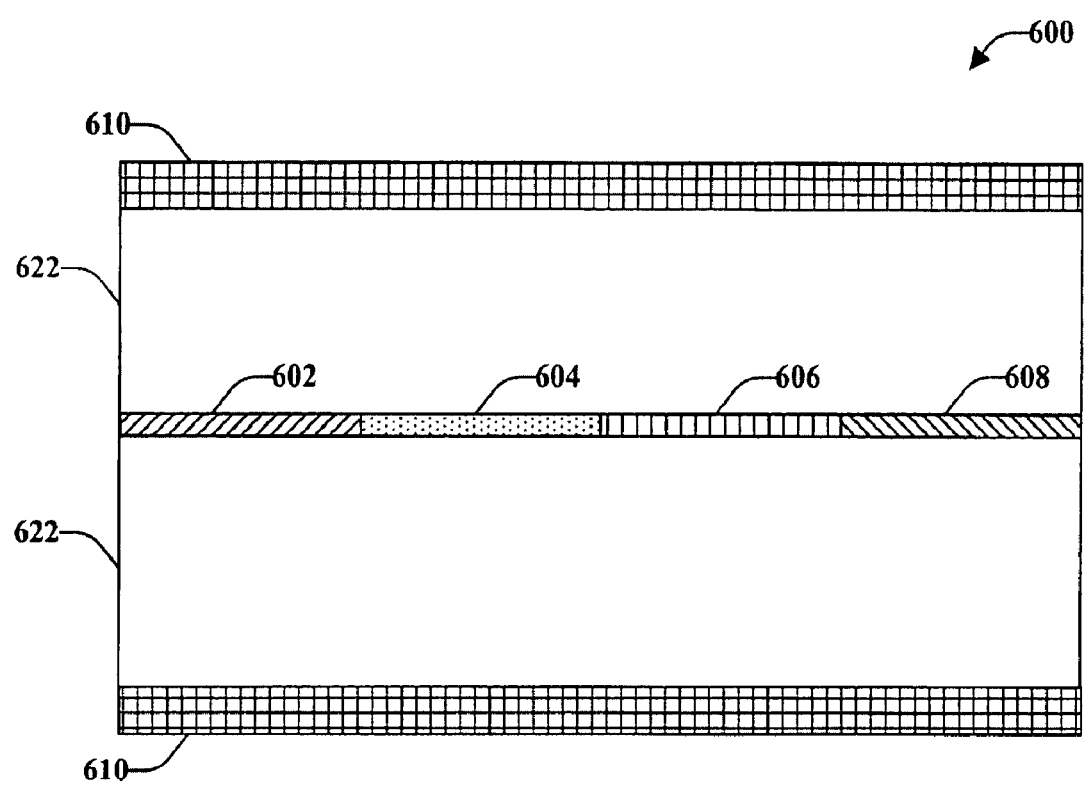
FIG. 6 illustrates aspects of a frame for a multiple access wireless communication system.

Referring to FIG. 6, aspects of a frame 600 for a multiple access wireless communication system are illustrated. Each forward link frame 600 may be divided into multiple segments. One, a control channel, comprising portions 602, 604, 606, and 608, which may or may not comprise a contiguous group of subcarriers, has a variable number of subcarriers assigned depending on the desired amount of control data and other considerations. The remaining portions are generally available for data transmission. These portions can comprise subcarriers assigned to either symbol rate users or block users, and both users may co-exist in one frame or be spread across multiple frames. That is contiguous subcarriers, in the case of block users, or contiguous subcarrier and/or non-contiguous subcarriers, in the case of symbol rate users, can be assigned for data transmission. This can be performed dynamically for each frame, based upon signaling in the control channel.

In accordance with some aspects, dynamic partitioning indicated by signaling (e.g., in the control channel of a frame) indicates how many subcarriers are allocated for symbol rate operation, the remaining subcarriers may be assumed to be block mode subcarriers. In other aspects, there may be certain global (across the deployment) permutation of subcarriers, such as $P(1) \ldots P(B)$ with B being the total number of subcarriers in the system. Indication of K subcarriers, to be the subcarriers in symbol rate mode would mean that subcarriers $P(1), P(2), \ldots, P(K)$ are in symbol rate mode while the remaining subcarriers are in block mode. The same or different permutation $P(.)$ may be used for each OFDM symbol to partition the subcarriers of that symbol into the symbol rate mode (distributed resource channel zone) and the block rate mode (block resource channel zone).

In further aspects, subband scheduling may be utilized, so that contiguous groups of subcarriers, or groups consisting of both non-contiguous and contiguous subcarriers, can be allocated to symbol rate or block mode communication as a group. By using subband type scheduling, the users with frequency selective channels can be better scheduled. Where subband scheduling is used, those subbands used for symbol rate mode have common pilots that are utilized for all users that are scheduled in the subband, or those in symbol rate mode. Those users scheduled in subbands for block mode, would not utilize common pilots and can use pilot symbols in the blocks so that those users scheduled in the block use only those pilots from the block and users in other blocks need not use the pilots.

In other aspects, quasi-static partitioning can be utilized. In such aspects, the number of subbands in symbol rate mode is an overhead parameter specified in the superframe preamble (e.g., in a broadcast channel). In another aspect, whenever more than one subband is allocated for symbol rate mode, there can be a mode that instructs scheduling a user across all the symbol rate subbands (e.g., subcarriers or groups of subcarriers assigned to symbol rate mode) thereby collecting higher diversity. Enabling this can be provided by defining the hopping sequence as a function of the number (set) of subbands in symbol rate mode. Another mode can be provided by localizing hopping to the subband (e.g., contiguous group or apportioned bandwidth, of subcarriers).

A control channel may include one or more pilot channels 302 and 304. In symbol rate mode, the pilot channels may be present on all of the OFDM symbols in each forward link frame, or only on the subbands that are allocated for symbol rate mode transmission. In both cases, the signaling channel 306 and the power control channel 308 may be present in the control channel. The signaling channel 306 may include assignment, acknowledgement, and/or power references and adjustments for data, control, and pilot transmissions on the reverse link. Power control channel 308 may carry information regarding interference generated at other sectors due to transmissions from access terminals of that sector.

It should be noted that where multiple transmit antennas may be used to transmit for a sector, the different transmit antennas should have the same superframe timing (including the superframe index), OFDM symbol characteristics, and hop sequences.

In accordance with some aspects, the control channel 302, 304, 306, and 308 can comprise the same allocations as a data transmission (e.g., if data transmissions are block hopped then blocks of the same or different sizes may be allocated for the control channel).

Figure 7:
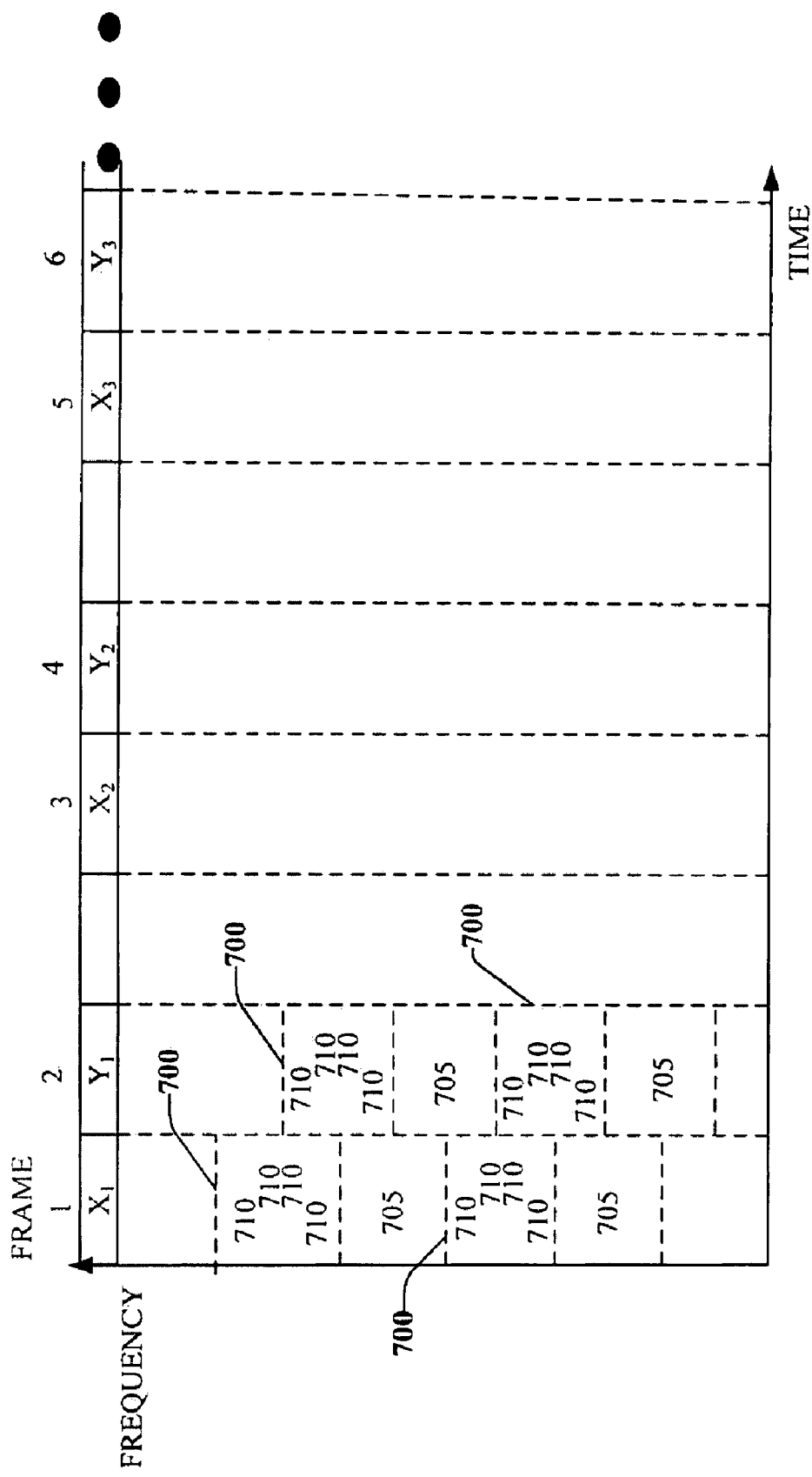
FIG. 7 illustrates aspects of a resource portioning scheme for a multiple access wireless communication system.

Referring to FIG. 7, aspects of a resource portioning scheme for a multiple access wireless communication system are illustrated.

In FIG. 7, the wireless communication system is partitioned into interlaces (e.g., interlace consisting of frames $X_1$, $X_2$, and $X_3$ and an interlace consisting of frames $Y_1$, $Y_2$, and $Y_3$). The number of interlaces and the frames per interlace may vary with system deployments. Further, the number of frames per interlace may be different for different interlaces, and may vary over time due to scheduler or system based changes.

In FIG. 7, each frame comprises block mode zones 700 and distributed mode zones 705. The block mode zones 700 comprise users that have contiguous assignments of OFDM symbols, subcarriers, or combinations thereof. The distributed zones 700 comprise users that have non-contiguous assignments of OFDM symbols, subcarriers, or combinations thereof.

As discussed above, assignments in distributed zone 705 can comprise distributed symbol-subcarrier combinations in the zone, while assignments in block zone 700 comprise contiguous symbol-subcarrier combinations in the zone. In some aspects, the zones 700 and 705 may comprise a subband (e.g., a predetermined number of subcarriers). Further, the number of subcarriers per zone 700 and 705 may vary on a frame by frame basis. Additionally, the location of the zones may vary by frame.

In alternate aspects, the location of zones 700 and 705 may be planned across a network. For example, sectors and/or cells that are adjacent to each other may have fixed bandwidth locations for zones 700 and 705, so that symbol rate mode users only interfere with other symbol rate mode users and not with block mode users.

In another aspect, on interlace X, the first L (physical) groups of subcarriers 710 (e.g., groups of 16 subcarriers) are grouped together, to form a block zone 700 while groups generally of the same size, not shown, are used to form distributed zones. In one aspect, the grouping of the groups of subcarriers 710 that form a zone may be based upon a bit-reversal order of their spectral location of the groups of subcarriers 710. That is, each groups of subcarriers 710 may be assigned a number that is expressed in bits (e.g., if there are 8 zones then each zone may have a 3-bit index). Therefore, by reversing the bit order of the index, frequency diversity may be provided to users of block mode. The frequency diversity may be further enhanced by frequency hopping the assignments for the users in block mode, between different zones 700 on a frame by frame basis, interlace by interlace basis, or some other basis. In another aspect, the groups 710 for each zone may be distributed across the band (e.g., uniformly spaced).

Further, in some aspects, the zones 700 and 705, may constitute subbands, which can be groups of contiguous subcarriers that have their resources assigned to one of the block or distributed mode. In other aspects, multiple groups of subcarriers 710 may comprise a subband (e.g., a subband may include N groups. In an aspect, a user may be scheduled to communicate on a particular subband, based upon channel conditions or selected preferences. In further aspects, where channel trees are utilized, each subband may have its own channel tree for scheduling, allowing one or more users to hop on that tree for the subband, independently of users operating on other subbands.

On the other interlace Y (e.g., the interlace after X) the block zone 700 can be cyclically shifted by j subbands or blocks, relative to interlace X. The cyclic shift may vary for each frame of the interlace, be constant for each frame of the interlace, or may comprise a single cyclic shift for all of the frames of the interlace. If there are more interlaces, then there may be a cyclic shift.

It should be noted that the zones 700 and 705 may be synchronized across sectors. This can be provided to facilitate interference estimation and fractional frequency re-use (FFR) operation.

In an aspect, on each interlace, each zone 700 or 705 may be further partitioned into one or more subzones that constitute multiple groups 710. In a subzone utilized in a block mode zone, each subzone includes contiguous groups 710 in that zone. This may be enumerated in the natural order of the spectral location of the groups 710 in the zone. In some aspects, a subzone may constitute a subband and each zone may constitute multiple subbands.

In a further aspect, a subzone of a distributed zone 705 includes consecutive groups in that zone, enumerated in bit-reversal order of their spectral location or in natural order of spectral location. In another aspect, the groups 710 for each subzone may be distributed across the band (e.g., uniformly spaced).

In an aspect, a distributed channel may include 16 tones per OFDM symbol. In a further aspect, each channel may hop within a distributed subzone, at symbol-rate, every OFDM symbol, or some other way. In other aspects, a block channel may include a 16 tone by 8 OFDM symbol tile. In a further aspect, each channel may hop within a block subzone at slot rate (e.g., varies per slot), which may comprise some or all of the OFDM symbols of the frame.

In some aspects, the hopping of channels within a subzone is independent across sectors. Further, where a channel tree is utilized each block and distributed subzone may be represented by a subtree (e.g., a group of consecutive base nodes and their parent nodes) of a channel tree may be assigned to a subzone. Mapping from channel nodes to channel resources within a subzone may be independent across sectors.

It should be noted that zones may include two-dimensional combinations of OFDM symbols and subcarriers. In such cases, for block mode, a zone, or subzone, may include less than all of the OFDM symbols of a frame and some number of subcarriers. In one exemplary aspect, a subzone may include 16 subcarriers by 8 OFDM symbols, and may be equal to one block. In some aspects, where a zone or subzone is in a frame, a channel tree may be used for resource assignment and in such cases each node may correspond to a two-dimensional combination of OFDM symbols and subcarriers that can correspond to a zone, subzone, or smaller unit of a two-dimensional combination.

In an aspect, as discussed above, the use of zones may be used to support FFR. In such cases, an FFR port-set (e.g., a resource partitionable for the purposes of FFR) may includes a collection of (subzone, interlace) pairs. A sector can adopt a certain power on each port-set. On some port-sets, a high power is transmitted, and on others a low power is transmitted. The objective is that these port-sets are synchronized either partly or completely among sectors in the neighborhood. In an aspect, to support improved diversity distributed and block BRCH subzones should belong to different port-sets. In further aspects, port-sets may be defined to sweep the whole bandwidth over multiple interlaces. Further, in some cases, different sectors use different power profiles on different port-sets (PBP) to provide further diversity.

In an aspect, access terminals report channel quality information, which may be different from one port-set to another port-set. Further, the channel quality information may be based on long term interference seen on that port-set. In a further aspect, one or more null pilots in every subzone or block to facilitate long-term interference measurements may be utilized. Although, this may not be required.

Figure 8:
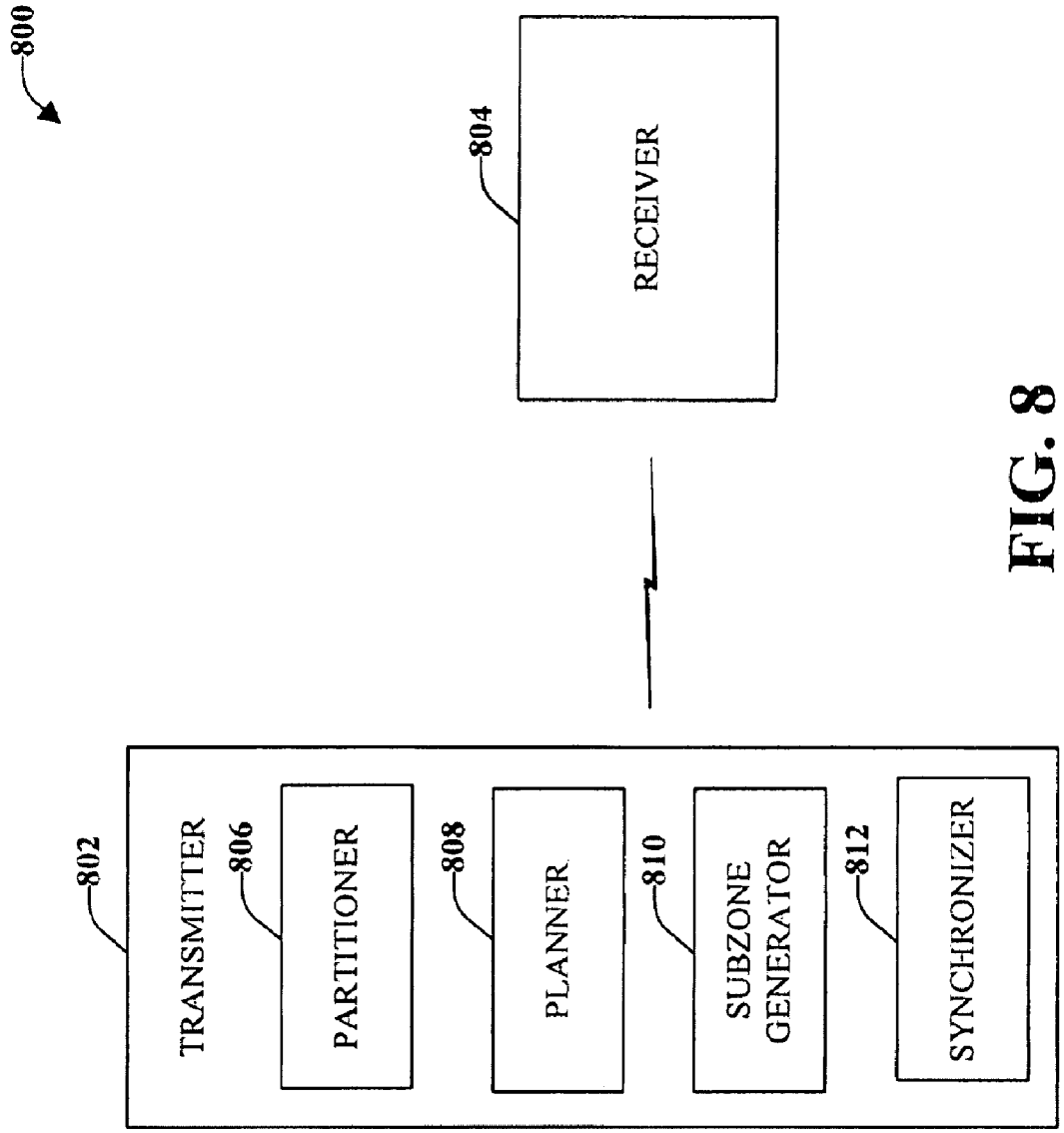
FIG. 8 illustrates an example system that facilitates resource partitioning and synchronization for a wireless communication network.

FIG. 8 illustrates an example system 800 that facilitates resource partitioning and synchronization for a wireless communication network. System 800 includes one or more transmitters 802 that are in wireless communication with one or more receivers. Transmitter 802 is similar to transmitter 302 of FIG. 3 and includes a partitioner 806 that assigns a mode to a user (such as receiver 804). The mode can be a block mode or a distributed mode. The mode determination can be made by monitoring a type of channel the user is experiencing, type of traffic a user is being served with, and other factors.

Also included in transmitter 802 is a planner 808 that can be configured to determine a zone of a user. The zone determination can be made based in part according to the mode of the user. Each zone can include at least one subband. A subzone generator 810 can partition the zone into multiple subzones. As used herein, the term "zones" refers to the type of hopping (symbol rate hopping or block rate hopping) and each zone can include multiple subzones. Hopping of resources relates to particular subzones, which should be synchronized among multiple sectors.

There are at least two ways to partition resources into BRCH and DRCH subzones. A first way is to choose subcarriers arbitrary based on a permutation. Another approach is to choose groups of blocks of subcarriers that belong to the same zone. In this case, the subcarriers are divided into a small number of subbands. Each subband includes some Q quantity of subcarriers. Then each of these subbands is chosen in some order, creating a permutation on the subbands rather than on the individual subcarriers. Based on this permutation the first few subbands are identified and the mode of hopping or permutation and hopping is declared for these subbands, such as the DRCH mode of hopping or permutation and hopping. The remaining subbands can be identified and declared to employ the other kinds of permutation and hopping.

A synchronizer 812 can be configured to synchronize each user in accordance with the mode and zone. A permutation that can be utilized for these subcarriers or zones is the bit reversal order. By way of example and not limitation, the number of elements that are to be partitioned can be a power of two. If there are 16 subcarriers or 16 subbands that need to be partitioned, the subcarriers or subbands can be labeled with a binary representation. After being labeled with the binary representation, the order of bits can be swapped or reversed to achieve a permutation. The first few subcarriers or subbands can be chosen in this bit reversal order to obtain a uniform sampling of the resources among the total set of resources. In accordance with some aspects, the set of subcarriers that are chosen for symbol rate hopping or BRCH is uniformly spaced so that subcarriers are chosen at regular spacing among the total set of subcarriers.

Bit reversal is a way of distributing subzones and in general, a two-bit reversal is utilized however, the number of zones might not be a power of 2. Bit reversal is defined for the case where the number of entries of the table desired to be permuated is a power of two. When the number of entries N is a power of two, each index can be represented with a bit and the entries can be easily permuted by taking a bit reversal version of the index. For example, if there is a table of size 8, the entry number 4 can be written, as 100. After applying bit reverse, the entry is now 001, which is "1". In other words, in this example, 4 will permeate to 1, and so on.

Bit reversal attempts to achieve distribution of elements (e.g., subbands) in more or less a uniform order. For example, to perform bit reversal on a table from 0 to 8, the first entry "0" is bit "0" and, therefore, keeps its original position. Then the second entry "1", which is next to "0" will move to 4 (e.g., 001 reversed is 100) and is now in the middle of the table. The next entry, 2 (which is 010), will go to the middle of the entry, and so forth. Thus, bit reversal takes the continuous elements, in this case the band, and attempts to distribute them across the whole band in as uniform a manner as possible. It should be remembered that this is not hopping. In another example, the total number of control bandwidth sizes conforms to 8 subbands. However, there should only be 3 subbands, for example, that belong to certain zones and it is desired that these be distributed and not clumped into a particular part of the spectrum. One manner of distributing them is to perform a uniform distribution where the total available bandwidth is divided by the number of zones and the carrier is defined. Bit reversal performs this in a slightly different manner but achieves the same goal, which is distributing the elements across the whole bandwidth.

Bit reversal takes elements that are contiguous and places them further apart. An advantage is that in different sectors, a different number of subzones is taken for DRCH. For example, for one sector, 4 subbands out of 8 subbands for DRCH, are chosen and for BRCH 2 subbands of the 8 subbands are chosen. Utilizing bit reversal permutation to perform the mapping, the first two subzones will be synchronized across both sectors. This might not have to be a regularly spaced sampling.

However, there can be many situations where the entries are not a power of 2. In this situation, a bit reversal is performed and the number of indices is sent to the closest (or largest) power of 2. Thus, the number of zones or subbands does not have to be a power of 2 and the algorithm can perform a function similar to bit reversal or pruned bit-reversal. Techniques related to pruned bit-reversal interleaver are described in commonly assigned U.S. patent application Ser. No. 11/022,485, entitled "PRUNED BIT-REVERSAL INTERLEAVER," filed Dec. 22, 2004.

Two sectors might take a different amount of resources for BRCH or DRCH. For example, if a first sector picks 5 subbands and the other sector picks 2 subbands, all the subbands cannot be synchronized because the numbers are different. However, at least two subbands chosen are synchronized. If the number is equal it will be totally synchronized and if number is unequal a best effort synchronization to the extent that it is the same size and each one of the sectors has more subbands is utilized.

In accordance with some aspects, synchronizer 814 can be configured to synchronize each user in accordance with the mode and zone according to a quasi-uniform spacing of tones in a distributed mode. The intention is the help make sure that in distributed mode (DRCH) tones are uniformly spaced across the whole set of available tones. Thus, for example, where there are a certain number of available tones (less guard tones), a certain number of tones that belong to DRCH or distributed zone can be distributed within the available tones. The goal is to have a uniform distribution but a problem is that in some cases, depending on how many tones are allocate to DRCH versus the number of available tones (also defined by guard tones), an exactly uniform distribution might not be available. This is because the ratio of the number of available tones to the number of tones belonging to the zone might not be an integer.

Thus, in distributed mode there might be a quasi-uniform spacing of tones or subcarriers. For example, if the total number of available tones is M*n and the total number of distributed tones is M*m (M tones per channel, M=16 in Ultra Mobile Broadband (UMB)), then find p and q such that:

$$n = p*m + q (0 <= q < m)$$

The first m tones of the distributed zone are located in the first block of n available tones such that there are q instances of spacing (p+1) and (m−q) instances of spacing p. The second m tones of the distributed zone are located in the second block of n available tones with the same positions of m tones as in the first block on n available tones, etc. The permutation-based techniques and the quasi-regular spacing techniques can be used either to select subcarriers for the DRCH zone or to select groups of subcarriers/subbands/subzones that go into a zone. These schemes may also be used to select subcarriers that go into each DRCH subzone (as opposed to a zone).

It should also be noted that the partial synchronization requirement across base stations can be utilized for the purpose of FFR. In other words, if a first base station uses M subcarriers in its DRCH zone while a second (neighboring) base station uses N subcarriers in its DRCH zone, the DRCH zone of the two base stations should have an overlap of min(M,N) subcarriers. Similar considerations can apply for DRCH zones. In a similar manner, if neighboring base stations use M and N DRCH subzones (of the same size) respectively, the resource partition of the two base stations should coincide with each other on min(M,N) DRCH subzones. The permutation based techniques discussed above can achieve these partial synchronization requirements. However, it should be noted that the quasi-regular spacing technique discussed in the above paragraph does not meet the partial synchronization criterion, although it satisfies the full synchronization requirement (the special case of the synchronization requirement, where M=N).

By way of example and not limitation, since channels are allocated in units of 16, the total number of available tones from which to choose the distributed zone is also multiple of 16. Thus, the space of all available tones is divided into 16 groups. In each of these 16 groups, the average channel will have one tone since every channel includes 16 tones. Distributed tones in the first group are decided, which are leading tones for every channel within a first group. Then, the remaining 15 tones are calculated over every channel at the same position in the respective 15 groups.

In another example, if there are five channels that need to be allocated, first the bandwidth (which can be 11*16) is subdivided into 16 contiguous groups. Each distributed channel will have 16 tones and every distributed channel will have one tone in every group. Any given channel consisting of 16 tones should have uniformly distributed tones. Thus, there are 5 distributed channels and every group in each channel contains 16 tones. If there is 1 tone present in a first channel at a given location, the remaining 15 tones of the same channel will be present in the remaining 15 groups at the same location. For the next channel, once the location of channel 1 is defined, that location will be the same for the remaining 15 groups. Thus, instead of distributing all 5*16, all that is needed is to decide how to distribute 5 tones for 5 channels (define 1 tone per channel) in the first subset of the group consisting of 11 tones. Once the location for the first tone of every channel in the first group is determined, the remaining 15 tones are duplicated in the remaining groups.

If in the above example, the size of the group is a multiple of the number of channels (e.g., size of group is 10 and number of channels is 5), they are spaced by a factor of 2. When it is not an integer (e.g., size of group is 11 and number of channels is 5), there will be three spacings of size 2 and one spacing of size 3 (e.g., quasi-uniformly spaced), for example.

In accordance with some aspects, the offset or position of all the tones is changing when going from one OFDM symbol to another OFDM symbol. Therefore, distributed mode is sometimes called symbol rate hopping (e.g., hopping occurs from symbol to symbol). Thus, there can be situations where a particular channel will have all its modulation symbols grouped in pairs and in every pair the channel conditions on a modulation symbol is as uniform as possible. To achieve this, instead of hopping every symbol, the hopping occurs every two symbols. For example, a symbol 0 will have a certain tone, which is the exact same tone utilized for symbol 1. When it changes to symbol 2, the tone jumps to a new location and symbol 3 has the same location. The tone then changes in symbol 4, and so forth. Thus, instead of simple rate hopping (every symbol) it hops every two-symbols and each pair of contiguous (even and odd OFDM symbols) will have the same tone.

In accordance with some aspects, different channels have different periodicities of hopping. Thus, some channels hop every symbol, while other channels hop every two-symbols, and so forth.

Figure 9:
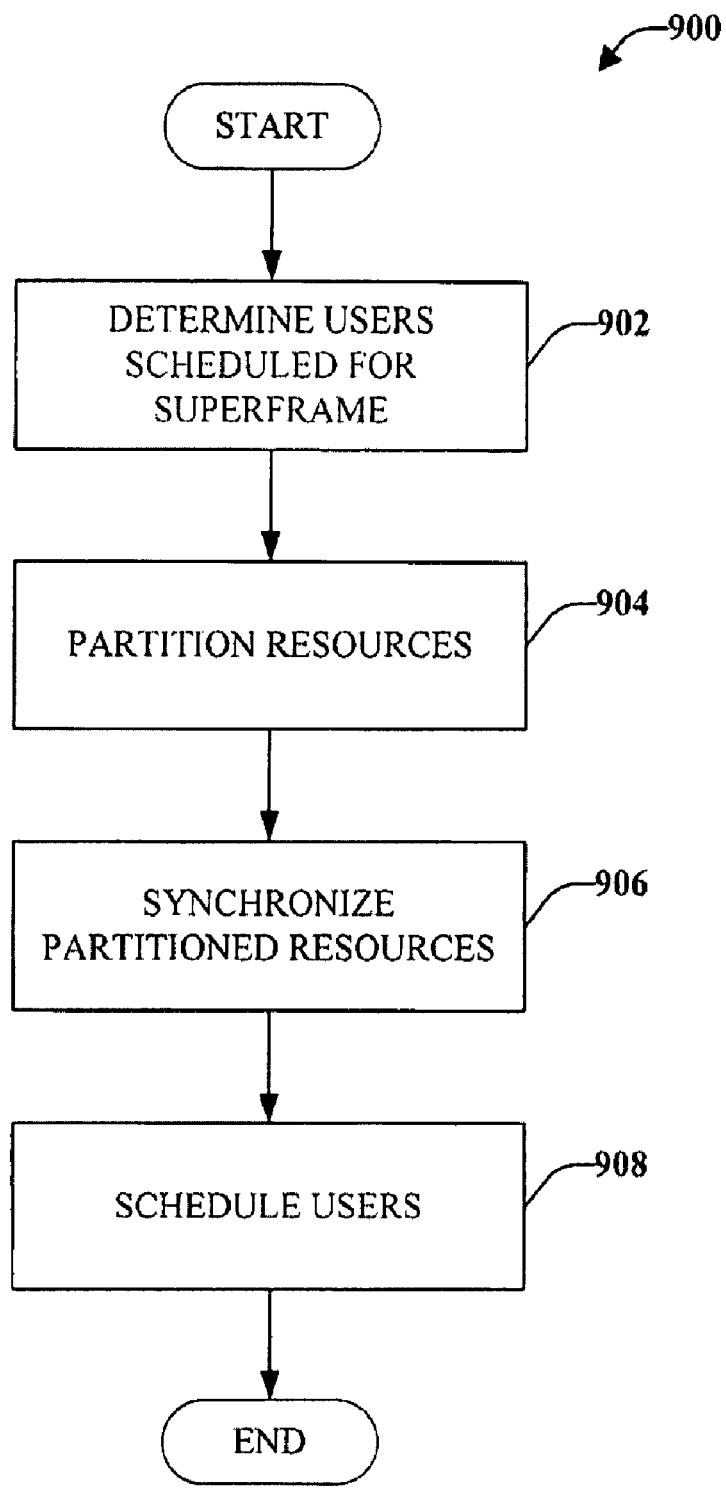
FIG. 9, illustrated is a method that facilitates partitioning of resources.

With reference now to FIG. 9, illustrated is a method 900 that facilitates partitioning of resources. While, for purposes of simplicity of explanation, the method is shown and described as a series of blocks, it is to be understood and appreciated that the claimed subject matter is not limited by the number or order of blocks, as some blocks may occur in different orders and/or concurrently with other blocks from what is depicted and described herein. Moreover, not all illustrated blocks may be required to implement the method described hereinafter. It is to be appreciated that the functionality associated with the blocks may be implemented by software, hardware, a combination thereof or any other suitable means (e.g. device, system, process, component). Additionally, it should be further appreciated that the methods disclosed hereinafter and throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

The users (and number of users) to be scheduled for a superframe are determined, at 902. The determination can be for the forward or reverse link, and may be based upon requests, pre-existing determinations, or combinations thereof. Further, the period at issue may be a superframe, a single frame, or some other time period, or duration.

After the number of users is determined, resources are partitioned, at 904. The resources can be partitioned into one of at least two modes, which are symbol rate hopping (also referred to as distributed resource channels) and block rate hopping (also referred to as block resource channels). The mode (distributed or block) can be determined according to channel conditions, which might have been previously reported channel conditions (e.g., Channel Quality Indicators (CQIs) from the users) or based on other criteria, including quality of service, and other factors that can be taken account into mode assignment. Further, the mode assignment could have been previously determined and can persist depending on the user and system parameters.

The mode can be determined based on which fraction of resources need to be in symbol rate hoping mode or block rate hopping mode. For example, a partition of subcarriers can be defined and a first amount of outputs of the permutation can be declared to be part of a symbol rate hopping subzone and the remaining outputs are part of a block rate hopping subzone. In such a manner, a rule by which the first amount is partitioned into the same zone is determined. A similar process can be employed to partition the zones further into multiple subzones. Individual carriers can be treated independently or groups of subcarriers can be treated as a unit to assist in ensuring that a group of subcarriers belong to the same subzone. In accordance with some aspects, groups of subcarriers are partitioned instead of individual subcarriers in some carriers. A group may comprise individual carriers that are arbitrarily chosen.

Thus, to create a zone, a subset of carriers can be chosen in some permuted order or random order. Then the first eight zones, for example, in the order are chosen to belong to DRCH zone or symbol rate hopping zone and the remaining subcarriers belong to the block rate hopping zone. Within these zones either block channels or distributed channels are created.

Distributed zones provide the maximum amount of diversity. The idea is block hopping and symbol hopping (DRCH/BRCH) relates to the situation where diversity is desired because the channel conditions cannot be predicted (e.g., fast moving channel or fast moving user), then DRCH can be utilized. On the other hand, to benefit from multi-user diversity (e.g., review conditions and choose a user whose particular condition in a particular part of the band is good), BRCH can be utilized.

Thus, in any particular system both DRCH and BRCH can be utilized. This is because in any system there can be some users moving fast and some users moving slow. There are data channels and control channels. For control channels, multi user diversity might not be able to apply, thus users moving fast can be scheduled on a distributed zone and users that moving slowly can be scheduled on a block zone and schedule control channel, for example, on block zone.

At 906, the resources partitioned are synchronized among multiple sectors so that on a particular set of resources all sectors in an area (e.g., geographic area) employ a similar means of operation (symbol rate hopping or block rate hopping), which can provide some consistency. The synchronization can include determining a zone and the resources can hop within the given zone. For example, if the zones are identical in different sectors a soft frequency reuse technique can be employed on the zones. Soft frequency reuse can provide that some sectors transmit at low power on certain zones and neighboring sectors transmit at high power on those zones. Thus, the sectors can attempt to avoid using high power on zones that are being used by others sectors. At 908, the user is scheduled according to the mode and zone, such as by a hopping algorithm or other approach.

Figure 10:
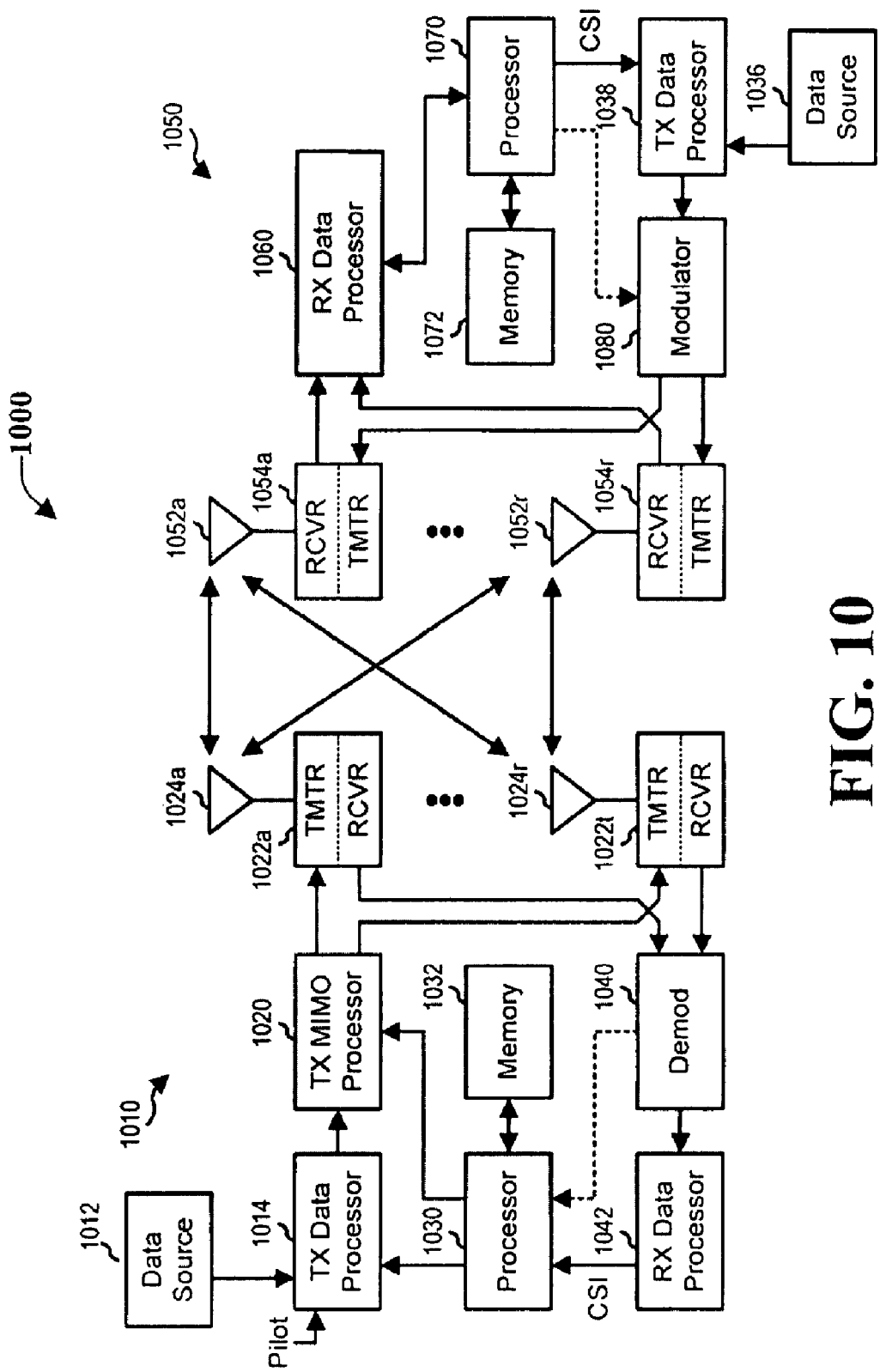
FIG. 10 illustrates aspects of a transmitter and receiver in a multiple access wireless communication system.

FIG. 10 illustrates a block diagram of an embodiment of a transmitter system 1010 (also known as the access point) and a receiver system 1050 (also known as access terminal) in a MIMO system 1000. At the transmitter system 1010, traffic data for a number of data streams is provided from a data source 1012 to a transmit (TX) data processor 1014.

In accordance with some aspects, each data stream is transmitted over a respective transmit antenna. TX data processor 1014 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (e.g., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 1030.

The modulation symbols for all data streams are then provided to a TX MIMO processor 1020, which may further process the modulation symbols (e.g., for OFDM). TX MIMO processor 1020 then provides $N_T$ modulation symbol streams to $N_T$ transmitters (TMTR) 1022a through 1022t. In some embodiments, TX MIMO processor 1020 applies beamforming weights to the symbols of the data streams and to the antenna from which the symbol is being transmitted.

Each transmitter 1022 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 1022a through 1022t are then transmitted from $N_T$ antennas 1024a through 1024t, respectively.

At receiver system 1050, the transmitted modulated signals are received by $N_R$ antennas 1052a through 1052r and the received signal from each antenna 1052 is provided to a respective receiver (RCVR) 1054a through 1054r. Each receiver 1054 conditions (e.g., filters, amplifies, and downconverts) a respective received signal, digitizes the conditioned signal to provide samples, and further processes the samples to provide a corresponding "received" symbol stream.

An RX data processor 1060 then receives and processes the $N_R$ received symbol streams from $N_R$ receivers 1054 based on a particular receiver processing technique to provide $N_T$ "detected" symbol streams. The RX data processor 1060 then demodulates, deinterleaves, and decodes each detected symbol stream to recover the traffic data for the data stream. The processing by RX data processor 1060 is complementary to that performed by TX MIMO processor 1020 and TX data processor 1014 at transmitter system 1010.

A processor 1070 periodically determines which pre-coding matrix to use (discussed below). Processor 1070 formulates a reverse link message comprising a matrix index portion and a rank value portion.

The reverse link message may comprise various types of information regarding the communication link and/or the received data stream. The reverse link message is then processed by a TX data processor 1038, which also receives traffic data for a number of data streams from a data source 1036, modulated by a modulator 1080, conditioned by transmitters 1054a through 1054r, and transmitted back to transmitter system 1010.

At transmitter system 1010, the modulated signals from receiver system 1050 are received by antennas 1024, conditioned by receivers 1022, demodulated by a demodulator 1040, and processed by a RX data processor 1042 to extract the reserve link message transmitted by the receiver system 1050. Processor 1030 then determines which pre-coding matrix to use for determining the beamforming weights then processes the extracted message.

Figure 11:
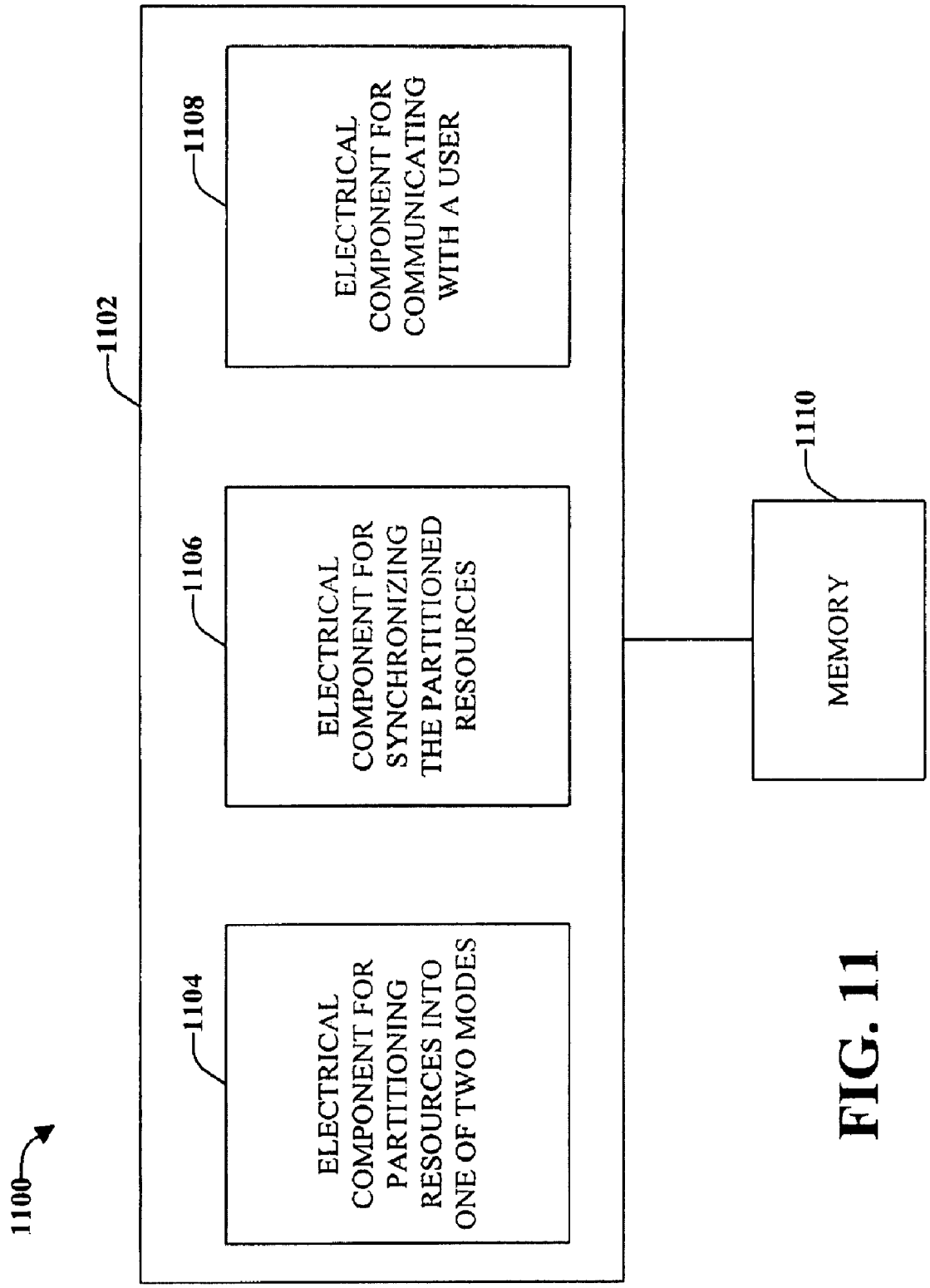
FIG. 11 illustrates an example system for partitioning and synchronizing resources.

With reference to FIG. 11, illustrated is an example system 1100 for partitioning and synchronizing resources. For example, system 1100 may reside at least partially within a base station. It is to be appreciated that system 1100 is represented as including functional blocks, which may be functional blocks that represent functions implemented by a processor, software, or combination thereof (e.g., firmware).

System 1100 includes a logical grouping 1102 of electrical components that can act separately or in conjunction. For instance, logical grouping 1102 may include an electrical component for partitioning resources into one of two modes 11104. The modes can be block mode or a distributed mode. Further, logical grouping 1102 can comprise an electrical component for synchronizing the partitioned resources among multiple sectors 1106. Also included can be an electrical component for communicating with a user according to the mode and the synchronization 1108. The communication can include transmitting signals to the user or receiving signals from the user, In accordance with some aspects, electrical component for partitioning resources into one of two modes 1104 further allocates a first group of subcarriers for symbol rate operation and designates a second group of subcarriers to block mode operation. Additionally or alternatively, the electrical component for synchronizing the partitioned resources among multiple sectors 1106 also determines a zone based in part on the mode. In accordance with some aspects, the zone can be determined according to a cyclic shift from a prior interlace. The electrical component for synchronizing the partitioned resources among multiple sectors 1106 can further divide the zone into a plurality of subzones and distribute the subzones utilizing a bit reversal order or a quasi-uniform spacing of tones. Each subzone can comprise a subband of subcarriers.

Additionally, system 1100 can include a memory 1110 that retains instructions for executing functions associated with electrical components 1104, 1106 and 1108 or other components. While shown as being external to memory 1110, it is to be understood that one or more of electrical components 1104, 1106 and 1108 may exist within memory 1110.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor through various means as is known in the art.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within scope of the appended claims. To the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description of the claims is meant to be a "non-exclusive or".

What is claimed is:

1. A method for partitioning resources, comprising:
    partitioning resources into modes;
    synchronizing the partitioned resources among multiple physical sectors, wherein said synchronizing includes determining a zone based in part on the modes, and dividing the zone into a plurality of subzones; and
    communicating with a wireless terminal according to the modes and the synchronization.

2. The method of claim 1, wherein the partitioning resources into modes comprises:
    allocating a first group of subcarriers for symbol rate operation; and
    designating a second group of subcarriers to block mode operation.

3. The method of claim 2, wherein dynamic partitioning indicated by signaling indicates the first group of subcarriers and remaining subcarriers are designated as the second group of subcarriers.

4. The method of claim 2, wherein there is a quasi-uniform spacing of subcarriers.

5. The method of claim 1, wherein the modes include a block mode or a distributed mode.

6. The method of claim 1, wherein the synchronizing the partitioned resources among multiple sectors further comprises:
    distributing the subzones utilizing a bit reversal order or a quasi-uniform spacing of tones.

7. The method of claim 6, wherein the bit reversal is a pruned bit reversal.

8. The method of claim 6, wherein each subzone comprises a subband of subcarriers.

9. The method of claim 6, wherein the zones are determined according to a cyclic shift from a prior interlace.

10. The method of claim 1, wherein the communicating with the wireless terminal comprises transmitting signals to the user or receiving signals from the wireless terminal.

11. A wireless communications apparatus, comprising:
    a processor that executes instructions for partitioning resources into one of two modes, synchronizing the partitioned resources among multiple physical sectors, wherein said synchronizing includes determining a zone based in part on the modes, and dividing the zone into a plurality of subzones, and communicating with a wireless terminal according to the modes and the synchronization; and
    a memory that stores information related to the instructions generated by the processor.

12. The wireless communications apparatus of claim 11, wherein the processor further executes instructions for allocating a first group of subcarriers for symbol rate operation and designating a second group of subcarriers to block mode operation.

13. The wireless communications apparatus of claim 12, wherein dynamic partitioning indicated by signaling indicates the first group of subcarriers and remaining subcarriers are designated as the second group of subcarriers.

14. The wireless communications apparatus of claim 12, wherein there is a quasi-uniform spacing of subcarriers.

15. The wireless communications apparatus of claim 11, wherein the modes include a block mode or a distributed mode.

16. The wireless communications apparatus of claim 11, wherein the processor further executes instructions for distributing the subzones utilizing a bit reversal order or a quasi-uniform spacing of tones.

17. The wireless communications apparatus of claim 16, wherein the bit reversal is a pruned bit reversal.

18. The wireless communications apparatus of claim 16, wherein each subzone comprises a subband of subcarriers.

19. The wireless communications apparatus of claim 17, wherein the zones are determined according to a cyclic shift from a prior interlace.

20. The wireless communications apparatus of claim 11, wherein the communicating with the wireless terminal comprises transmitting signals to or receiving signals from the wireless terminal.

21. A wireless communications apparatus that provides resource partitioning, comprising:
    means for partitioning resources into one of two modes;
    means for synchronizing the partitioned resources among multiple physical sectors, wherein said means for synchronizing further determines a zone based in part on the mode, and divides the zone into a plurality of subzones; and
    means for communicating with a wireless terminal according to the modes and the synchronization.

22. The wireless communications apparatus of claim 21, wherein the means for partitioning resources into modes further allocates a first group of subcarriers for symbol rate operation and designates a second group of subcarriers to block mode operation.

23. The wireless communications apparatus of claim 22, wherein dynamic partitioning indicated by signaling indicates the first group of subcarriers and remaining subcarriers are designated as the second group of subcarriers.

24. The wireless communications apparatus of claim 22, wherein there is a quasi-uniform spacing of subcarriers.

25. The wireless communications apparatus of claim 21, wherein the modes includes a block mode or a distributed mode.

26. The wireless communications apparatus of claim 21, wherein the means for synchronizing the partitioned resources among multiple sectors further distributes the subzones utilizing a bit reversal order or a quasi-uniform spacing of tones.

27. The wireless communications apparatus of claim 26, wherein the bit reversal is a pruned bit reversal.

28. The wireless communications apparatus of claim 26, wherein each subzone comprises a subband of subcarriers.

29. The wireless communications apparatus of claim 26, wherein the zones are determined according to a cyclic shift from a prior interlace.

30. The wireless communications apparatus of claim 21, wherein the communicating with the wireless terminal comprises transmitting signals to or receiving signals from the wireless terminal.

31. A non-transitory machine-readable medium having stored thereon machine-executable instructions for:
   partitioning resources into block mode or a distributed mode;
   synchronizing the partitioned resources among multiple physical sectors, wherein said synchronizing includes determining a zone based in part on the mode, and dividing the zone into a plurality of subzones; and
   communicating with a wireless terminal according to the modes and the synchronization.

32. The non-transitory machine-readable medium of claim 31, wherein the instructions further comprise instructions for:
   allocating a first group of subcarriers for symbol rate operation; and
   designating a second group of subcarriers to block mode operation.

33. The non-transitory machine-readable medium of claim 31, wherein the instructions further comprise instructions for:
   distributing the subzones utilizing a bit reversal order or a quasi-uniform spacing of tones.

34. An apparatus for use in a wireless communication system, the apparatus comprising:
   a processor configured to:
      partition resources into modes, wherein the partitioning resources into modes operates to:
         allocate a first group of subcarriers for symbol rate operation; and
         designate a second group of subcarriers to block mode operation;
      synchronize the partitioned resources among multiple physical sectors, wherein said synchronizing operates to:
         determine a zone according to the modes;
         divide the zone into a plurality of subzones; and
         distribute the subzones utilizing a bit reversal order or a quasi-uniform spacing of tones.

35. The method of claim 1, wherein dynamic partitioning indicated by signaling indicates that a first group of subcarriers is operating in a first mode and that remaining subcarriers are designated as a second group of subcarriers operating in a second mode.

36. The method of claim 1, wherein there is a quasi-uniform spacing of the resources that are partitioned into modes.

37. The method of claim 1, wherein a pruned bit reversal order is used to distribute the subzones.

38. The method of claim 1, wherein the zones are determined according to a cyclic shift from a prior interlace.

* * * * *